United States Patent
Zeghlache

(10) Patent No.: US 12,032,539 B2
(45) Date of Patent: Jul. 9, 2024

(54) AUTOMATED QUALITY CONTROL OF WELL LOG DATA

(71) Applicant: SAUDI ARABIAN OIL COMPANY, Dhahran (SA)

(72) Inventor: Mohamed Larbi Zeghlache, Al Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 62 days.

(21) Appl. No.: 17/321,170

(22) Filed: May 14, 2021

(65) Prior Publication Data

US 2022/0365913 A1    Nov. 17, 2022

(51) Int. Cl.
  *G06F 16/215*    (2019.01)
  *G06F 16/25*    (2019.01)
  *E21B 49/00*    (2006.01)

(52) U.S. Cl.
  CPC ............ *G06F 16/215* (2019.01); *E21B 49/00* (2013.01); *G06F 16/25* (2019.01)

(58) Field of Classification Search
  CPC ......... G06F 16/215; G06F 16/25; E21B 49/00
  See application file for complete search history.

(56) References Cited

U.S. PATENT DOCUMENTS

| | | | |
|---|---|---|---|
| 6,675,101 B1 * | 1/2004 | Shray ..................... | G01V 11/00 702/6 |
| 7,277,796 B2 | 10/2007 | Kuchuk et al. | |
| 8,204,692 B2 | 6/2012 | Arango et al. | |
| 8,457,898 B2 | 6/2013 | Hartmann et al. | |
| 9,957,780 B2 | 5/2018 | Knecht et al. | |
| 10,353,111 B2 * | 7/2019 | Sanstrom ............... | G01V 11/00 |
| 10,551,522 B2 | 2/2020 | Donderici et al. | |
| 2006/0136461 A1 | 6/2006 | Lee et al. | |

(Continued)

FOREIGN PATENT DOCUMENTS

| | | |
|---|---|---|
| CA | 3 070 868 C | 10/2022 |
| CN | 101976494 B | 6/2013 |

(Continued)

OTHER PUBLICATIONS

Harmon, "What Is Data Integrity", Published: Nov. 20, 2020, https://www.technologynetworks.com/informatics/articles/what-is-data-integrity-343068, Hereinafter "Harmon" (Year: 2020).*

(Continued)

*Primary Examiner* — Maher N Algibhah
(74) *Attorney, Agent, or Firm* — Osha Bergman Watanabe & Burton LLP

(57) ABSTRACT

A method and a system for well log data quality control is disclosed. The method includes obtaining a well log data regarding a geological region of interest, verifying an integrity and a quality of the well log data, determining the quality of the well log data based on a quality score of the well log data and making a determination regarding the access to the databases based on the quality of data. Additionally, the method includes performing the statistical analysis and the classification of well log data, a predictive and a prescriptive analysis of trends and predictions of the well log data, and generating an action plan for datasets with unsatisfactory quality scores.

20 Claims, 7 Drawing Sheets

(56) References Cited

U.S. PATENT DOCUMENTS

| | | | |
|---|---|---|---|
| 2008/0133137 A1* | 6/2008 | Tatro | G06Q 10/06 |
| | | | 702/6 |
| 2010/0312477 A1 | 12/2010 | Sanstrom et al. | |
| 2012/0144325 A1 | 6/2012 | Mital et al. | |
| 2016/0358120 A1 | 12/2016 | Moore et al. | |
| 2017/0206289 A1* | 7/2017 | Schoen | G06F 30/20 |
| 2017/0220938 A1 | 8/2017 | Sainani et al. | |
| 2018/0038992 A1* | 2/2018 | Macdonald | G01V 1/40 |
| 2018/0298746 A1 | 10/2018 | Short et al. | |
| 2019/0318021 A1* | 10/2019 | Hiu | G06F 16/215 |
| 2020/0165910 A1 | 5/2020 | Andresen et al. | |
| 2020/0372057 A1 | 11/2020 | Tonkin et al. | |
| 2020/0378239 A1* | 12/2020 | Jones | E21B 47/13 |
| 2020/0378248 A1* | 12/2020 | Maus | E21B 7/04 |
| 2021/0199831 A1* | 7/2021 | Lunny | G01V 1/40 |
| 2022/0268148 A1 | 8/2022 | Fulton et al. | |
| 2022/0365913 A1 | 11/2022 | Zeghlache | |
| 2023/0259798 A1 | 8/2023 | Modugula et al. | |

FOREIGN PATENT DOCUMENTS

| | | |
|---|---|---|
| CN | 112859183 A | 5/2021 |
| WO | 2020/065365 A1 | 4/2020 |
| WO | 2020/065374 A1 | 4/2020 |

OTHER PUBLICATIONS

Non-Final Office Action issued in corresponding U.S. Appl. No. 17/814,447, dated Sep. 14, 2023 (29 pages).

* cited by examiner

AUTOMATED QUALITY CONTROL OF WELL LOG DATA

BACKGROUND

In the oil & gas industry, wells are drilled for exploration, development and production purposes. A lot of money is being spent in oil and gas industry to collect data that is vital to the management and optimization of assets. One of the most complex and diverse data is well data where sensors are deployed at surface or in downhole conditions to collect real-time or memory data, in rig and rigless locations, in onshore and offshore environment.

In most cases, service providers provide this data to the operators in different format such as DLIS, LIS, LAS, PDF, CGM, and Excel. DLIS or LAS files have to pass data quality validation before going into a company's database. This validation process is tedious and usually takes very long time. One DLIS or LAS file may contain hundreds or thousands of data channels that are difficult to be visualized and validated manually. Sometimes it takes multiple iterations of communication between the data provider and the data receiver to achieve a final valid data deliverable. For now, this tedious task is usually performed by a human expert using a well log interpretation software. The expert needs to visualize and check all data channels one by one for its validity and then summarizes all issues in a report provided to the data providers as feedbacks.

The value in this data greatly depends on its quality and conformance with the pre-defined standard operating procedures (SOP). These SOP's are guidelines to ensure data quality as well as to standardize data formatting. With millions of files that are uploaded into the operator's databases, it is extremely critical to ensure compliance of these files before they are validated and archived. With this huge number of files and the limited capability to check them one by one by data technicians and log analyst, automation is a key to ensure systematic and methodic approach to this challenge.

SUMMARY

In general, in one aspect, the invention relates to a method for well log data quality control. The method includes obtaining, by a computer processor, well log data regarding a geological region of interest, the well log data including static and dynamic data, performing, by the computer processor, data manipulation to verify an integrity and a quality of the well log data, determining, by the computer processor, the quality of the well log data based on a quality score of well log data, and granting, by the computer processor, the access to a database to the well log data with satisfactory quality score.

In general, in one aspect, the invention relates to a system for well log data quality control. The system comprising a hardware processor, a database configured to store verified and validated well log data with a satisfactory quality score, a checkpoint module configured to obtain and the well log data regarding a geological region of interest, the well log data including static and dynamic data, perform an statistical analysis and a classification of the obtained well log data, perform data manipulation to verify an integrity and a quality of the well log data, determine the quality of the well log data based on a quality score of well log data, and grant the access to a database to the well log data with satisfactory quality score, a data management module configured to generate an interactive visualization of results of the statistical analysis and the classification of the well log data and generate a report of an action plan for processing the well log data.

BRIEF DESCRIPTION OF DRAWINGS

Specific embodiments disclosed herein will now be described in detail with reference to the accompanying figures. Like elements in the various figures are denoted by like reference numerals for consistency. Like elements may not be labeled in all figures for the sake of simplicity.

DETAILED DESCRIPTION

Figure 1:
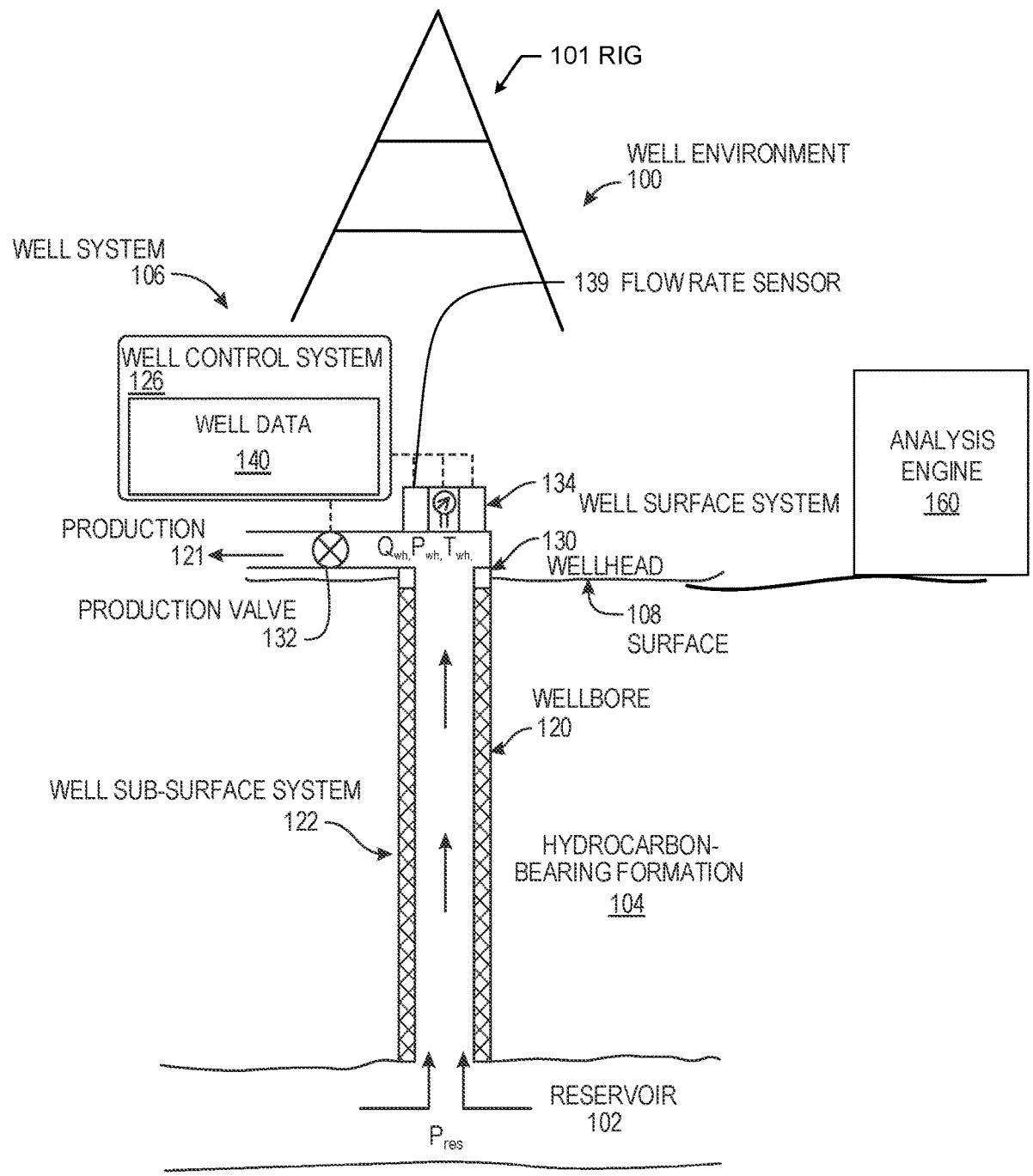
FIG. 1 shows a system in accordance with one or more embodiments.

In the following detailed description of embodiments disclosed herein, numerous specific details are set forth in order to provide a more thorough understanding disclosed herein. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein provide a method and a system, referred to as a checkpoint, for well log data quality control. Quality control is a process that ensures that the product quality is satisfactory through the procedure. It involves a plurality of testing stages that determine if the data is within the predetermined specifications of the desired product. Data may be tested to comply with different specifications, depending on user (211) needs. More specifically, this disclosure introduces automating the quality control and quality assurance of well log data using artificial intelligence (AI). The checkpoint system provides security and quality checks that regulate access to the well log data stored in a database or data repository (207). The well log data is analyzed for potential anomalies and threats. In one or more embodiments, based on the quantity and type of potential anomalies and threats, a quality score is computed and assigned to a dataset of the well log data. Datasets with an unsatisfactory quality score are not granted access to data repositories (207) and they may undergo a further analysis.

The quality score reflects a percentage of well log data that is compliant with reference standards such as data structure (401), data integrity (402), data quality (403), data compliance (404), data accuracy (405), and data repeatability (406). Additionally, classifying a type of violation enables calculating the score percentage by assigning weights for each error regarding, at least, a data type, a data channel, and an accuracy repeatability. In one or more embodiments, the percentage indicating the quality score is translated to a score card based on the adequate percentage determined by the admin and a type of deficiency (as missing primary data channel, missing units, and out of range data).

The score cards are classified into three groups. A red score card is assigned to the datasets with inadequate quality score and violations such as missing the data channel, missing the data within the channel, wrong channel name, wrong channel unit, and wrong file naming standard. An access to the database is rejected for the datasets assigned with the red score card and the user report, proponent alert, and proponent report are generated. A yellow score card is assigned to the datasets with inadequate quality score and minor violations such as having an additional channel or the out-of-range data. The access to the database is rejected for the datasets assigned with the yellow score card and the user report, proponent alert, and proponent report are generated. A green score card is assigned to the datasets with adequate quality score and no violations. The access to the database is allowed for the datasets assigned with the green score card and proponent alert is generated.

The main technical advantage of the proposed disclosure introduces the automated well data quality control with a plurality of sophisticated capabilities and features. This disclosure systematically tackles the issue of validating data in an automatic and rapid manner, covering all types of log measurements. Specifically, the automated checkpoint system includes at least a data loading module, a quality assurance and control module, a machine learning module, an admin module, and a reporting module. These modules are discussed further in FIGS. 2-5.

To being with, FIG. 1 shows a schematic diagram in accordance with one or more embodiments. As shown in FIG. 1, a well environment (100) in which well log data quality control may be implemented, includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

The well system (106) includes a rig (101), a wellbore (120), a well sub-surface system (122), a well surface system (134), and a well control system ("control system") (126). The well control system (126) may control various operations of the well system (106), such as well production operations, well drilling operation, well completion operations, well maintenance operations, and reservoir monitoring, assessment and development operations. In some embodiments, the well control system (126) includes a computer system that is the same as or similar to that of a computer system (700) described below in FIG. 7 and the accompanying description.

The rig (101) is the machine used to drill a borehole to form the wellbore (120). Major components of the rig (101) include the drilling fluid tanks, the drilling fluid pumps (e.g., rig mixing pumps), the derrick or mast, the draw works, the rotary table or top drive, the drill string, the power generation equipment and auxiliary equipment.

The wellbore (120) includes a bored hole (i.e., borehole) that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "downhole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) lowered into the hydrocarbon-bearing formation (104) or the reservoir (102) during monitoring operations (e.g., during in situ logging operations).

In some embodiments, during operation of the well system (106), the well control system (126) collects and records well data (140) for the well system (106). During drilling operation of the well (106), the well data (140) may include mud properties, flow rates, collected by a flow rate sensor (139), drill volume and penetration rates, formation characteristics, etc. In some embodiments, the well data (140) are recorded in real-time, and are available for review or use within seconds, minutes or hours of the condition being sensed (e.g., the measurements are available within 1 hour of the condition being sensed). In such an embodiment, the well data (140) may be referred to as "real-time" well data (140). Real-time well data (140) may enable an operator of the well (106) to assess a relatively current state of the well system (106), and make real-time decisions regarding a development of the well system (106) and the reservoir (102), such as on-demand adjustments in drilling fluid and regulation of production flow from the well.

In some embodiments, the well surface system (134) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (134) includes flow regulating devices that are operable to control the flow of substances into and out of the wellbore (120). For example, the well surface system (134) may include one or more production valves (132) that are operable to control the flow of production. For example, a production valve (132) may be fully opened to enable the unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (134).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include a set of high pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Figure 2:
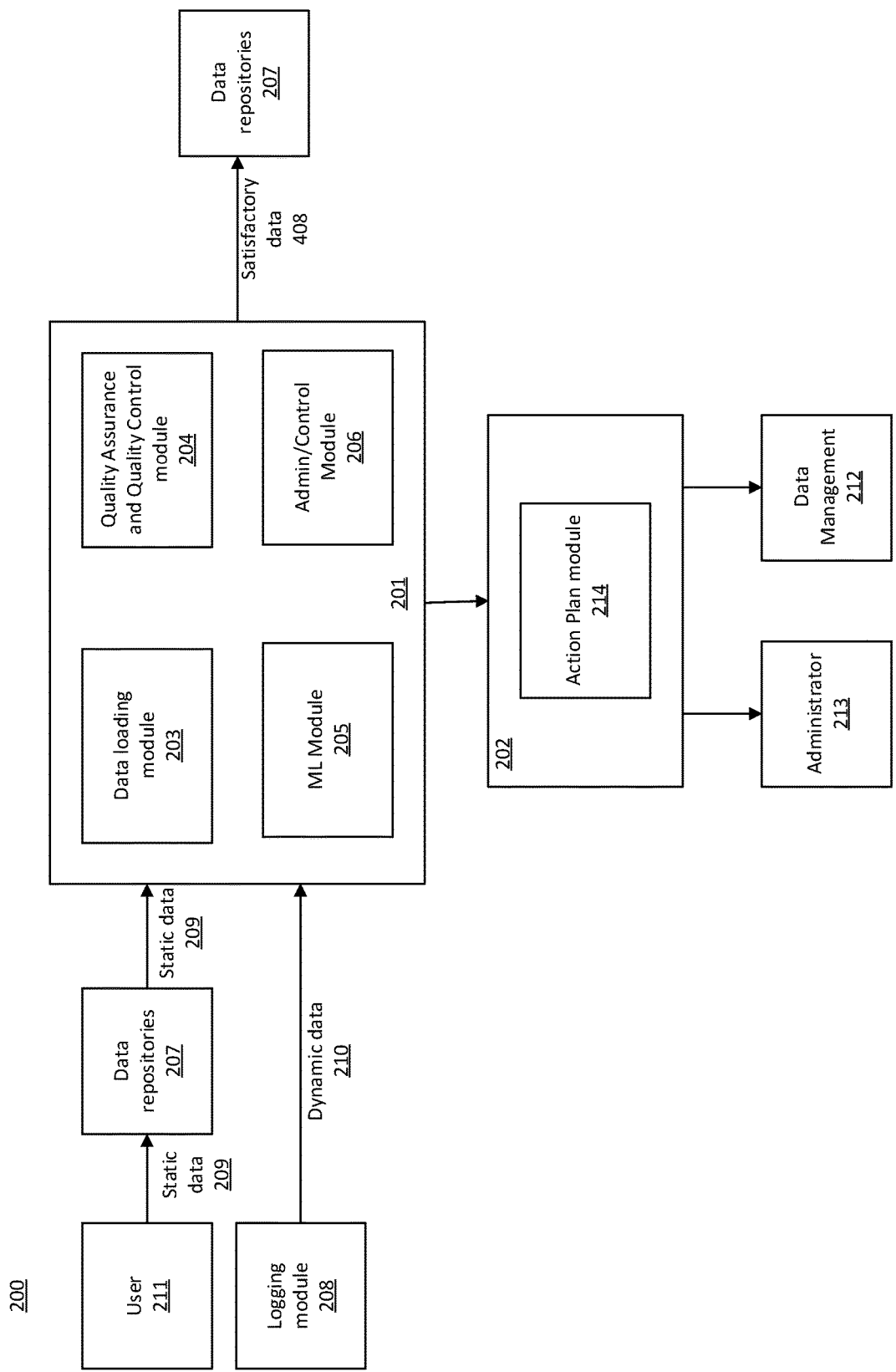
FIG. 2 shows a flowchart of checkpoint quality control stages in accordance with one or more embodiments.

In some embodiments, the well control system (126) collects and records well data (140) for the well system (106). A logging module (208), as depicted in FIG. 2, may generate datasets of dynamic data (210) based on the collected well data (140). Further, the well system (106) is provided with an analysis engine (160). For example, the dynamic logging module (208), controls/analysis stage (201) and reporting/display stage (202) depicted in FIG. 2 may be part of the analysis engine (160) that includes hardware and/or software with functionality for analyzing well log data.

More specifically, in one or more embodiments, FIG. 2 depicts a checkpoint system (200) having two stages of the well log data quality control: a controls/analysis stage (201), and a reporting/display stage (202). In one or more embodiments, the checkpoint system (200) implements security and quality checks which result in either granting access to the good data into the corporate data repositories (207) or detecting anomalies and threats and denying access with clear scoring and reporting to the data originator. The checkpoint may be equipped with multiple modules (202-206) that perform quality control and analysis tasks. The modules (202-206) within the checkpoint system (200) allow a bidirectional workflow from a user (211) and an admin (213) to data repositories (207), which increases communication between data stakeholders. Essentially, the checkpoint system (200) is a link between the data stakeholders and a central data repository (207), performing under the rules of the standard operating procedure (SOP). The data repositories (207) may be any data structure capable of storing data, such as databases organized as tables, arrays, lists, caches, etc. These data repositories (207) may be permanent storage, solid state storage devices, temporary storage, or any other suitable type of storage. The modules of the checkpoint system (200) described below may be implemented as hardware, software, firmware, or any combination thereof.

In some embodiments, initial parameters used for the well log data quality control are based on static (209) and dynamic (210) data. The static data (209) is data that does not change after being recorded. The static data (209) may be stored in one or more data repositories (207). Further, the static data (209) may be provided by the user (211) or it may include results from previous processes. For example, data repositories (207) may be any data structure for storing data and may itself be stored in the cloud or on any suitable computing device. These data repositories (207) act as a central hub of data records and SOP compliance guidelines. Further, static data (209) may be stored as Digital Log Interchange Standard (DLIS) format, LAS, image, time-lapse or as a main log. The dynamic data (210) comes from the logging module (208) and represents real-time data coming directly from the rig or wellbore (120). It may be received as real-time streaming data or play-back of static data.

Stage 201 of the checkpoint system (200) represents the first stage of the well log data quality control cycle. The first stage (201) includes algorithms and controls for the analysis of the static (209) and dynamic (210) data. The algorithms and controls in the first stage (201) interact with data repositories (207) and logging module (208), and do not interact with the end users, with the exception of an admin (213) in an admin module (206). In one or more embodiments, the first stage (201) may consist of multiple specific modules with particular functionalities, such as a data loading module (203), a quality assurance and quality control module (204), a machine learning (ML) module (205), and an admin/control module (206). Each of these modules of the first stage (201) of the checkpoint system (200) is discussed further below.

Data loading module (203) is responsible for reading one file or multiple files at once (from a folder, zipped files, a server, streaming data, etc). More specifically, data loading module (203) receives the static data (209) from the data repositories (207) and the dynamic data (210) from the logging module (208). The logging module (208) may receive data from various tools/systems for sensing and/or measuring, such as an impulse hammer geomechanical probe, a hyperspectral and Fourier transform spectrometer, a NMR spectrometer, an acoustic transducer, and a resistivity logging. For example, the logging module (208 may receive data from a logging tool, used for acquiring logging measurements, that is lowered into the wellbore (120) and/or used in the laboratory to acquire measurements as the tool traverses through the wellbore (120). The received data may be formatted as a single compressed file that contains large quantities of log files or individual log files in at least one of DLIS, LAS, image or main log formats.

Figure 3:
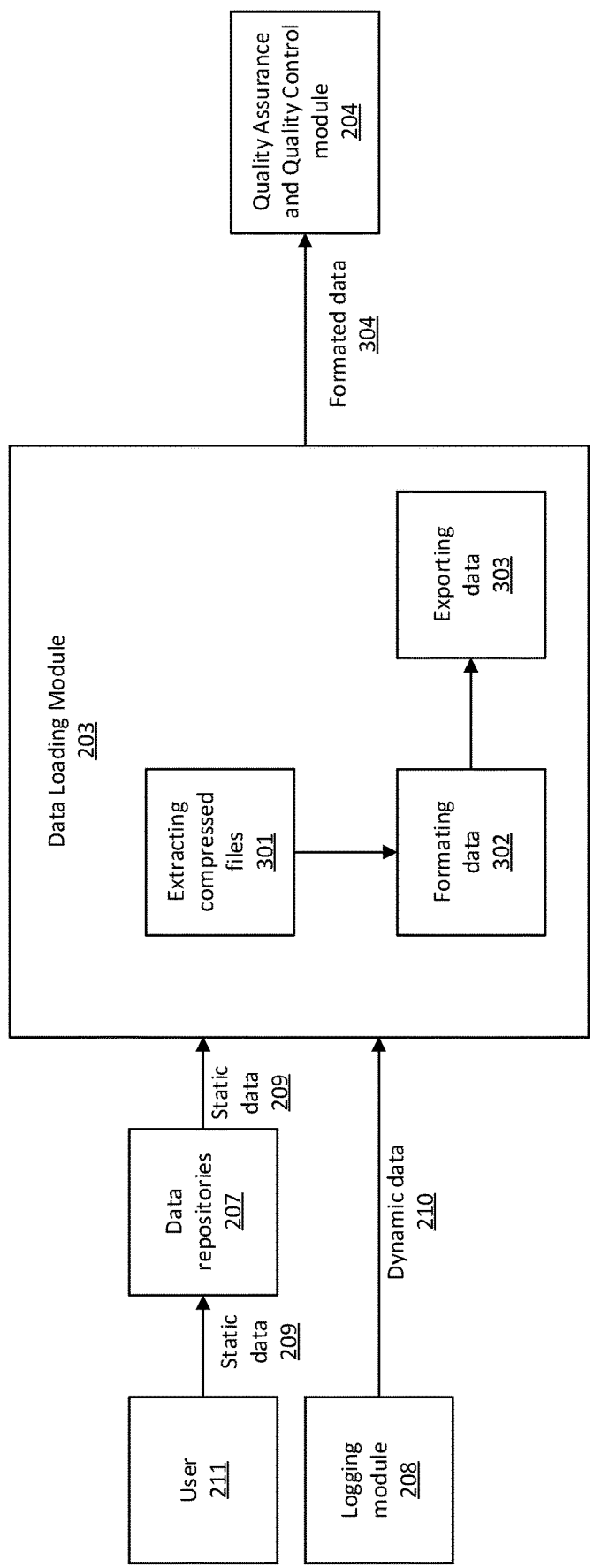
FIG. 3 shows a flowchart of Loading module in accordance with one or more embodiments.

FIG. 3 depicts internal processes within the data loading module (203). As mentioned above, the data loading module (203) receives data in a variety of formats. If received files are in a compressed format, by extracting compressed files (301) all compressed files are decompressed to ensure easier and more precise formatting. Further, the data loading module (203) is configured to format (302) the received data into a singular format to maintain consistency throughout the analytical process. In one or more embodiments, the formatted data (304) is exported (303) by the data loading module (203) to the quality assurance and quality control module (204).

Continuing with FIG. 2, the quality assurance (QA) and quality control (QC) module (204) receives the formatted data (304) from the data loading module (203). The quality assurance and quality control module (204) contains a plurality of sub-modules that check the loaded data from the data loading module versus the input reference and controls from the admin and control module (206) and sends results of the comparison for display by the reporting module (202) in stage two of the checkpoint system (200). In addition, in one or more embodiments, module 204 feeds the machine learning algorithms with input for further AI analysis of data errors and violations.

Figure 4:
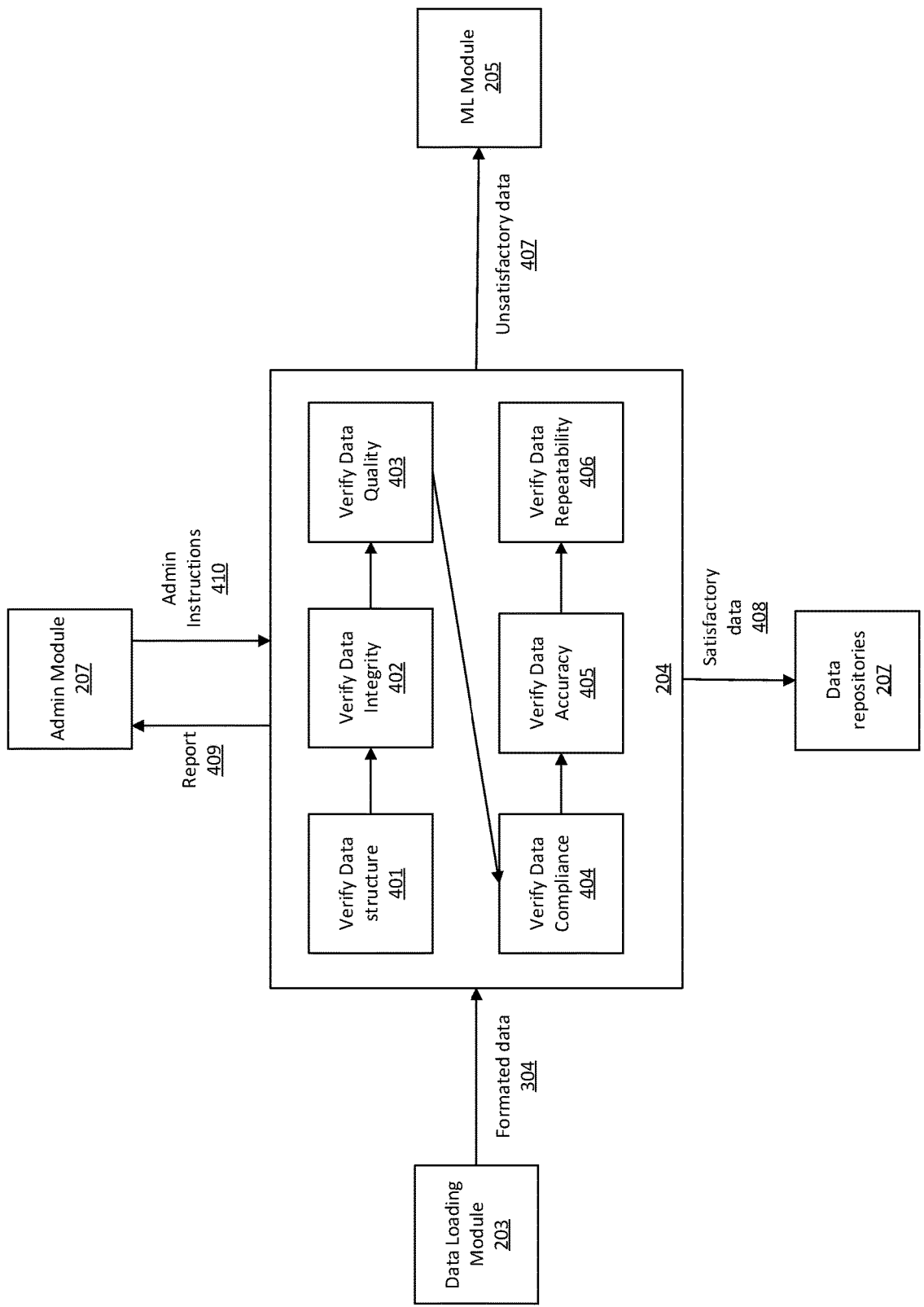
FIG. 4 shows a flowchart of Quality assurance and quality control module in accordance with one or more embodiments.

FIG. 4 depicts internal processes and sub-modules within the QA and QC module (204). The sub-modules of module 204 include at least a verify data structure module (401), a verify data integrity module (402), a verify data quality module (403), a verify data compliance module (404), a verify data accuracy module (405), and a verify data repeatability module (406).

Specifically, the formatted data (304) is verified for corresponding data structures (401) to ensure at least that there is no discrepancy between data type and data units of the same petrophysical or geomechanical property (e.g., porosity, water saturation, unconstrained sonic velocities, near-surface gas permeability, etc.). Verifying the integrity (402) of the formatted data (304) involves testing data for recoverability, searchability, traceability, and connectivity. Sub-module (402) at least looks for human error, transfer error, viruses and malicious data. Additionally, quality of data is verified (403) to ensure reliability of a dataset. Verification of data compliance (404) ensures at least that sensitive data is organized in a way to meet organization or government rules and legal regulations. Further, sub-module (404) regulates security policy to prevent security incidents regarding the stored and analyzed data. Verification of data accuracy (405) ensures that the data values are correct and represented in a consistent and unambiguous form. Finally, verifying data repeatability (406) ensures that various tests on the same dataset will result with the same result.

After the well log data undergoes the verifications in QA and QC module (204), a quality score is computed, based on the results of the verifications and according to a criteria determined by the admin. Based on the quality score, well log datasets are categorized in, for example, a red, yellow, and green group. The well log datasets categorized in the red and yellow groups are rejected and the well log datasets categorized in the green group are accepted and stored into the data repository (207). The red group marks well log datasets with an unsatisfactory quality score (407). Criteria for assigning the well log dataset an unsatisfactory quality score (407) may be if the well log dataset contains at least one missing data channel, is missing data within a channel, has incorrect channel name, incorrect channel unit, and/or incorrect file naming standard. The yellow group also marks well log datasets with an unsatisfactory quality score (407) having different criteria that is met for an unsatisfactory quality score (407). Criteria for unsatisfactory data score in the yellow group may be when the well log dataset contains at least additional channels, issues with clipping, issues with splicing, an incorrect data range, and/or data that is out of range. The green group marks well log datasets with a satisfactory quality score (408). Satisfactory data (408) contains well log datasets without mistakes/errors, and this dataset is stored to the data repository (207).

The well log datasets with unsatisfactory quality score (407) are forwarded to the machine learning module (205) for further analysis. Finally, a report (409) about the verification process is sent to the admin module (206) for review.

Continuing with FIG. 2, the machine learning (ML) module (205) receives the data with unsatisfactory quality score (407) from the quality assurance and quality control module (204). The ML module (205) contains a plurality of sub-modules that analyze the data with unsatisfactory score (208) and sends results of the analysis to the admin module (206). In addition, in one or more embodiments, the admin module (206) provides instructions and parameters to the machine learning module (205) for further AI analysis of data errors and violations and determines the criteria for calculating the quality score.

Figure 5:
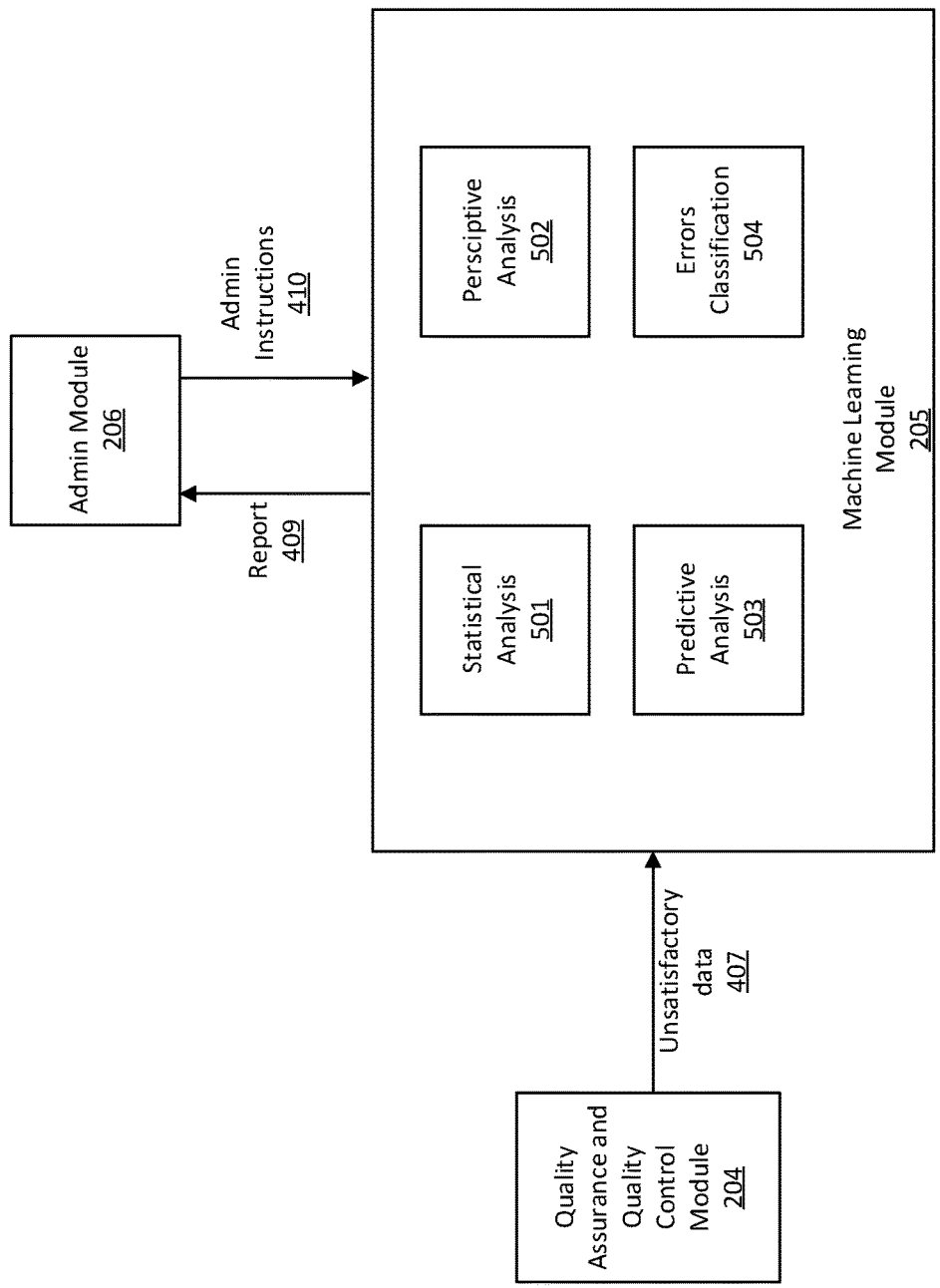
FIG. 5 shows a flowchart of Machine learning module in accordance with one or more embodiments.

FIG. 5 depicts internal processes and sub-modules within the ML module (205). The ML module performs advance analysis of datasets with unsatisfactory scores (408). The statistical analysis (501) explores relations between the datasets with the unsatisfactory score (408), organizes and describes anomalies and threats. The statistical analysis (501) provides processed information as at least in a form of a log track, a histogram, and a pie chart, and color coded with the validation output types, including keys, units, upper and lower bounds of values, the mean. Statistical analysis (501) may create a visualization of a data channel in a log track, a histogram, and a pie chart, with the highlighted validation output types. Additionally, the statistical analysis (501) may generate a heat map containing all the data channels in log track and highlighted based on the quality of data.

Predictive analysis (502) relies on decision analysis, transactional profiling, and predictive modeling to analyze the anomalies and threats. The predictive analysis (502) uses historical data and results of the statistical analysis (501) to predict future anomalies and threats. Additionally, the predictive analysis (502) may generate quality control (QC) curves and compare them with calibration data or standard responses to validate the well log data. Specifically, for example, the QC curves may show a calculated cumulative thickness from the provided individual thicknesses, and a comparison of this data to the total thickness curve. In another embodiment, the QC curves may represent a calculation of a data channel frequency, mean and standard deviation, that is compared with a reference distribution response. The QC curves may be used to optimize future work and issue early warnings to the stakeholders. The prescriptive analysis (503) goes beyond predicting options and suggests a range of data quality controls that need to be implemented to overcome violations and reduce anomalies and threats. Employing the predictive (502) and the prescriptive (503) analysis provides an insight in the potential future trends and options and suggests actions to achieve desired goals. Error classification (504) classifies anomalies and threats according to the predefined criteria. It identifies major contributors and provides root cause analysis for the action plan.

Continuing with FIG. 2, the admin/control module (206) is configured to store the key performance indicators (KPIs), standard operating procedures (SOPs), and Line Quality Control (LQCs). The SOPs are pre-defined guidelines which ensure data quality as well as for standardized data formatting. With millions of files that are uploaded into the operator's databases, it is extremely critical to ensure compliance of these files before they are validated and archived. The admin/control module (206) allows for automation of the comparison process to ensure a systematic and methodic approach to validating all the received files. The admin/control module (206) receives reports (409) from both the QA and QC module (204) and ML module (205), and these reports are compared to the KPIs and SOPs stored therein. In addition, the admin module (206) may provide instructions to the QA and QC module (204) and ML module (205) based on the results of the comparisons performed.

As shown in FIG. 2, stage 202 of the checkpoint system (200) represents the second stage of the well log data quality control cycle. The second stage (202) reports the results of the checkpoint process to the data repositories (207) and data management (212) modules and includes an action plan module (214) configured to create an action plan. In addition, the reporting stage (202) interacts with the analysis modules of the first stage (201) and end stakeholders. More specifically, in one or more embodiments, the reports generated by the reporting stage 202 of the checkpoint process may include, but are not limited to, a report to the user (211) with checkpoint results, a report to the data management module (212) by well name, service company, service name, date, period, etc., visualizing the results of QA/QC and ML modules, a data delivery KPI report for non-technical actions, and a valid pass for data archiving once the scorecard turns to green for any specific data file or dataset (static data). The report stage (202) may also generate prescriptive analytics to improve controls of the admin/control module (206).

The reporting stage (202) includes an action plan module (214). Specifically, the action plan module (214) generates an action plan based on the score categories (red, yellow, green) to which the well log dataset belongs. In one or more embodiments, the action plan module (214) includes functionality to generate three action plans, one for each category of quality scores groups. The red and yellow groups may invoke generating an action plan that includes, at least, rejecting data, generating a user report for the user (211), generating a proponent alert, generating a proponent report, and updating statistics. In addition, an action plan for datasets in the green group may invoke generating an action plan that includes, at least, accepting data, generating a proponent alert, and updating statistics.

In one or more embodiments, the action plan(s) generated by the action plan module (214) are triggered by the checkpoint process and rely on a systematic and continuous monitoring of data delivery key performance indicators set in the admin/control module (206). Such action plans may be defined by service name, service type, delivery time (time from acquiring data in the field to time of receiving final green pass for data archiving), and/or delivery time allowance (number of days required to deliver data as per controls). The action plan delivers the results and proposed actions to multiple stakeholders, such as the user (211), the admin (213), a finance department, a contract department, and a management department. If the dataset is rejected, the user (211) receives a report summarizing the reasons for such decision and violations that need to be fixed. The action plan module (214) provides the admin (213) with the use of the checkpoint algorithms and outputs to improve the checkpoint performance, and to upgrade and add new features. The finance department are delivered calculations of the data delivery key performance indicators, which are related to discounts and payments based on bad, delayed, or non-entered data that would require a payment modification. Additionally, the contract team are provided with the calculations of the market share allocation, contract negotiations, renewal or application of contract terms and conditions related to service delivery key performance indicators. The management department are provided with conclusions regarding the service provider evaluation and arbitration.

Figure 6:
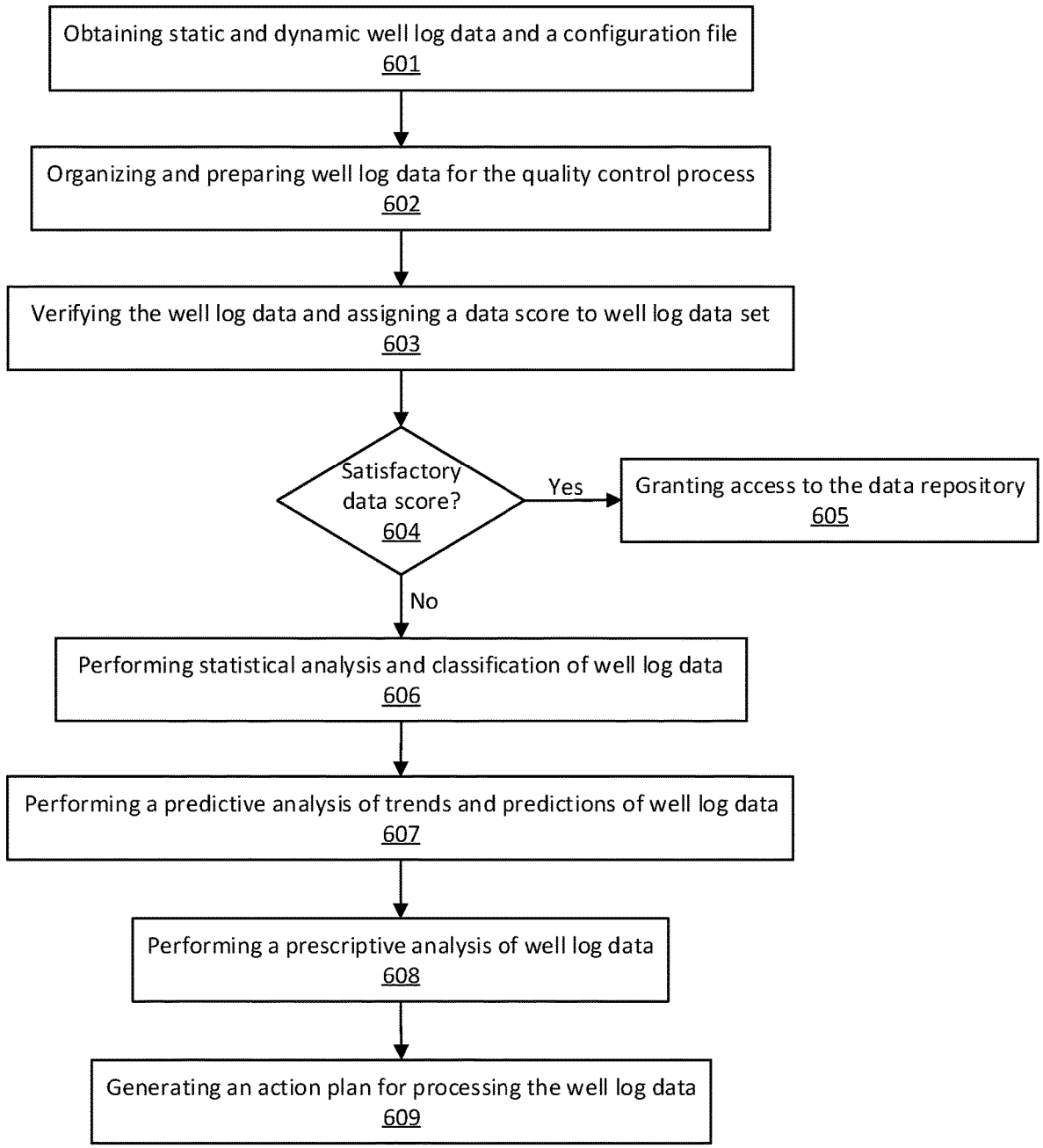
FIG. 6 shows a flowchart in accordance with one or more embodiments

FIG. 6 shows a flowchart in accordance with one or more embodiments. Specifically, FIG. 6 describes a method for well log data quality control. While the various blocks in FIG. 6 are presented and described sequentially, one of the ordinary skill in the art will appreciate that some or all of the block may be executed in a different order, may be combined or omitted, and some or all of the blocks may be executed in parallel.

Initially in Block 601, the well log data is obtained from multiple sources. Specifically, the well log data may be uploaded by the user (211) to the data repository (207), stored in the data repository (207) in the previous quality control processes, and real-time data coming directly from the wellbore (120).

In Block 602, well log data is organized to a singular format to maintain consistency throughout the rest of the process. For example, data represented in different units or with different decimal fractions is standardized before the qualify verification process. In addition, data obtained in compressed files is uncompressed (301), ensuring more precise formatting. The singular format of the data may be in any suitable form, such as XML, HTML, etc.

In Block 603, the structure, integrity, quality, compliance, accuracy, and repeatability of the formatted data is verified using sub-modules and processes as described in FIG. 4 above. Verification of data properties (204) ensures, at least, that the well log data is consistent, without errors or viruses, reliable, secure, and a correct representation of the wellbore (120). After the well log data undergoes the verifications, a quality score is computed, based on the results of the verifications and according to a criteria determined by the admin.

In Block 604, it is determined if the computed quality score is satisfactory, based on the criteria determined by the admin. The well log datasets with satisfactory quality score (408) are approved and granted access to the data repository (207). The well log datasets with unsatisfactory quality score (407) are flagged and forwarded for a detailed analysis.

In Blocks 606, 607, and 608 the advanced analysis of well log datasets with unsatisfactory score (408) is performed. Specifically, the statistical analysis (501) explores relations between the datasets with the unsatisfactory score (408) and provides visualization of the processed well log data. The predictive (502) and the prescriptive (503) analysis provides an insight in the potential future trends and options and suggests actions to achieve desired goals. Specifically, the predictive (502) and the prescriptive (503) analysis analyze trends to predict future anomalies and threats and suggest optimizations to overcome violations and reduce anomalies and threats.

In Block 609, the action plan is generated based on the categories to which the well log dataset belongs. In one or more embodiments, the action plan module (214) includes three action plans, one for each category of quality scores groups. The action plan includes approving or rejecting the well log dataset, generating a report and notifying the stakeholders about the result of the well log data quality control process. That is, the checkpoint system either grants access to the good data into the data repositories (207) or detects anomalies and threats and denies access with clear scoring and reporting to the data originator (i.e., the user, the admin, the stakeholders).

Figure 7:
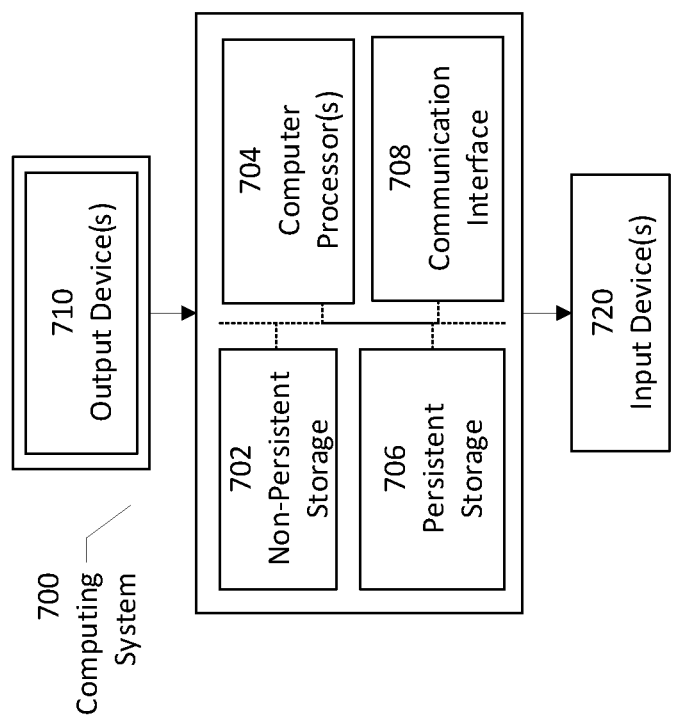
FIG. 7 shows a computer system in accordance with one or more embodiments.

Embodiments may be implemented on a computing system. Any combination of mobile, desktop, server, router, switch, embedded device, or other types of hardware may be used. For example, as shown in FIG. 7, the computing system (700) may include one or more computer processors (704), non-persistent storage (702) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (708) (e.g., Bluetooth interface, infrared interface, network interface, optical interface, etc.), and numerous other elements and functionalities.

The computer processor(s) (704) may be an integrated circuit for processing instructions. For example, the computer processor(s) may be one or more cores or micro-cores of a processor. The computing system (700) may also include one or more input devices (720), such as a touchscreen, keyboard, mouse, microphone, touchpad, electronic pen, or any other type of input device.

The communication interface (708) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (710), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (704), non-persistent storage (702), and persistent storage (706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

While the disclosure has been described with respect to a limited number of embodiments, those skilled in the art, having benefit of this disclosure, will appreciate that other embodiments may be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for well log data quality control, the method comprising:
   obtaining, by a computer processor, well log data regarding a geological region of interest, the well log data including static and dynamic data obtained by an impulse hammer geomechanical probe, a hyperspectral and Fourier transform spectrometer, a Nuclear Magnetic Resonance (NMR) spectrometer, and an acoustic transducer;
   performing, by the computer processor, data manipulation to verify an integrity and a quality of the well log data;
   determining, by the computer processor, the quality of the well log data based on a quality score of well log data; and
   granting, by the computer processor, an access to a database to the only these well log data with adequate quality score,
   wherein the quality score of the well log data is based on the integrity of the well log data, the integrity of the well log data being based on the manipulation of data for recoverability, searchability, traceability, and connectivity, and
   wherein production flow of a well is controlled based on the well log data with the adequate quality score.

2. The method of claim 1, further comprising:
   performing, by the computer processor, a statistical analysis and a classification of well log data with inadequate quality score;
   performing, by the computer processor, a predictive analysis of trends and predictions of the well log data with inadequate quality score;
   performing, by the computer processor, based on the predictive analysis, a prescriptive analysis of the well log data with inadequate quality score; and generating, by the computer processor, an action plan for processing the well log data with inadequate quality score.

3. The method of claim 1, wherein an administrator determines a set of rules and criteria for analyzing and classifying the well log data.

4. The method of claim 1, wherein the static data is processed and projected data, extracted from a plurality of digital files.

5. The method of claim 1, wherein the dynamic data is raw data from sensors, the sensors collecting real-time or play-back data at surface or in downhole conditions.

6. The method of claim 1, wherein the quality score is based on correlation between measured data and a standard response.

7. The method of claim 2, wherein the action plan contains results of a process, calculations and proposals to stakeholders.

8. The method of claim 2, wherein results of the action plan are visualized in a log track, a histogram, and a pie chart, and color coded with validation output types, including keys, units, upper and lower bounds of values, a mean, and a description of data channels.

9. The method of claim 2, wherein results of the action plan are visualized as a heat map, the heat map containing log tracked and color-coded data channels.

10. The method of claim 9, wherein the heat map visualization identifies a distribution of detected anomalies and threats.

11. A system for well log data quality control, comprising:
a database configured to store verified and validated well log data with a adequate quality score;
a processor configured to:
obtain well log data regarding a geological region of interest, the well log data including static and dynamic data obtained by an impulse hammer geomechanical probe, a hyperspectral and Fourier transform spectrometer, a Nuclear Magnetic Resonance (NMR) spectrometer, and an acoustic transducer;
perform a statistical analysis and a classification of the obtained well log data;
perform data manipulation to verify an integrity and a quality of the well log data;
determine the quality of the well log data based on a quality score of well log data;
grant an access to a database to only these well log data with adequate quality score;
generate an interactive visualization of results of the statistical analysis and the classification of the well log data; and
generate a report of an action plan for processing the well log data,
wherein the quality score of the well log data is based on the integrity of the well log data, the integrity of the well log data being based on the manipulation of data for recoverability, searchability, traceability, and connectivity, and
wherein production flow of a well is controlled based on the well log data with the adequate quality score.

12. The system of claim 11, wherein the processor is further configured to:
perform a statistical analysis and the classification of well log data with inadequate quality score;
perform a predictive analysis of trends and predictions of well log data with inadequate quality score;
perform based on the predictive analysis, a prescriptive analytics of well log data with inadequate quality score; and
generate the action plan for processing the well log data with inadequate quality score.

13. The system of claim 11, wherein an admin determines a set of rules and criteria for analyzing and classifying the well log data.

14. The system of claim 11, wherein the static data is processed and projected data, extracted from a plurality of digital files.

15. The system of claim 11, wherein the dynamic data is raw data from sensors, the sensors collecting real-time or play-back data at surface or in downhole conditions.

16. The system of claim 11, wherein the quality score is based on discrepancies between measured data and benchmark calibration data or standard response.

17. The system of claim 16, wherein the action plan contains results of a process, calculations and proposals to stakeholders.

18. The system of claim 11, wherein results of the analysis are visualized in a log track, a histogram, and a pie chart, and color coded with validation output types, including keys, units, upper and lower bounds of values, a mean, and a description of data channels.

19. The system of claim 11, wherein results of the analysis are visualized as a heat map, the heat map containing log tracked and color-coded data channels.

20. The system of claim 19, wherein the heat map visualization identifies a distribution of the detected anomalies and threats.

* * * * *